United States Patent [19]
Gellert

[11] Patent Number: 4,688,622
[45] Date of Patent: Aug. 25, 1987

[54] INJECTION MOLDING MANIFOLD MEMBER AND METHOD OF MANUFACTURE

[76] Inventor: Jobst U. Gellert, 233 Armstrong Avenue, Georgetown, Ontario, Canada, L7G 4X5

[21] Appl. No.: 390,174

[22] Filed: Jun. 21, 1982

Related U.S. Application Data

[63] Continuation-in-part of Ser. No. 340,232, Jan. 18, 1982, abandoned.

[30] Foreign Application Priority Data

Jan. 6, 1982 [CA] Canada .................................. 393671

[51] Int. Cl.[4] ............................................. B22D 19/04
[52] U.S. Cl. ....................................... 164/61; 164/80; 164/112
[58] Field of Search ................... 164/80, 61, 98–105, 164/253, 112

[56] References Cited

U.S. PATENT DOCUMENTS

| | | | |
|---|---|---|---|
| 2,469,800 | 5/1949 | Vogel | 338/240 X |
| 2,469,801 | 5/1949 | Vogel et al. | 338/240 |
| 2,890,318 | 6/1959 | Kruse | 164/98 X |
| 3,064,112 | 11/1962 | Hanzel | 164/98 X |
| 3,093,872 | 6/1963 | Pagonis | 164/253 X |
| 3,727,667 | 4/1973 | Bell | 164/80 |
| 3,937,268 | 2/1976 | Loebs et al. | 164/80 X |
| 3,998,264 | 12/1976 | Hocking | 164/80 X |

FOREIGN PATENT DOCUMENTS

| | | | |
|---|---|---|---|
| 238258 | 1/1960 | Australia | 164/108 |
| 1464452 | 12/1966 | France | 164/108 |

*Primary Examiner*—Kuang Y. Lin
*Attorney, Agent, or Firm*—Riches, McKenzie & Herbert

[57] ABSTRACT

This invention relates to an elongated heating manifold member for injection molding and a method of making it. Channels are cut into the steel body to run parallel to a hot runner passage extending through the body. An electric heating element is centrally located in the channels using small spacer clips to provide a space around the heating element, and the channels are sealed at the ends. A highly conductive material such as a copper alloy is cast into the space around the heating element in a vacuum furnace. This forms an integral unit with the copper alloy fused to both the heating element and the steel body which substantially improve heat transfer in the manifold member. This avoids the creation of "hot spots" which otherwise may result in the heating element burning out, and maintains an even temperature along the hot runner passage which reduces deterioration of the melt due to overheating.

3 Claims, 7 Drawing Figures

4,688,622

INJECTION MOLDING MANIFOLD MEMBER AND METHOD OF MANUFACTURE

This application is a continuation-in-part of co-pending application Ser. No. 340,232 filed Jan. 18, 1982 now abandoned.

BACKGROUND OF THE INVENTION

This invention relates to injection molding and more particularly to an improved heated manifold member and a method of manufacturing the same.

The increasing use of injection molding to make a wide variety of products has led to its use to mold a greater variety of materials. However, some of the materials with the most desirable product properties have relatively critical narrow temperature ranges. Therefore, it has become even more desirable to be albe to maintain the melt at its optimum temperature throughout its flow through the hot runner passage.

In the past, manifold members or configurations having different heater arrangements have been used. For instance, it is known to locate cartridge or tubular heaters in a channel in the manifold member with mechanical contact provided by wedging material around the heater or by cementing the heaters in with a heat transfer cement. However, these structures have the disadvantage that there is still considerable resistance to heat transfer across the materials and interfaces between the heating element and the manifold member body which has two unsatisfactory results. The first is that the application of heat to the melt flowing through the manifold member is not uniform so that it is not maintained at a constant predetermined temperature which has become more critical with the increasing use of materials which are more difficult to mold. The second is that in spots along the heating element where heat resistance is high due to inadequate construction, the temperature of the electrical resistance wire itself may rise to the point where it will burn out. These effects are amplified by the fact that temperature of the heating element must be maintained generally higher than it otherwise would be if improved heat transfer were provided across to the body of the manifold member. It is, or course, imperative that an entire operating system not be frequently shut down to replace a burnt out heating element and that the properties of the product not be deteriously effected by overheating of the material. Consequently, it has been found to be impossible or impractical to run certain types of material with this type of structure.

SUMMARY OF THE INVENTION

Accordingly, it is an object of the present invention to at least partially overcome these problems by providing a manifold member with a structure having provision for increased uniform heat flow and a relatively efficient method of manufacturing the same.

To this end, in one of its aspects, the invention provides an integral electrically heated injection molding manifold member comprising an elongated body portion formed of a suitable strong conductive material with a hot runner passage extending therethrough and at least one longitudinally extending channel in an external surface of the body portion; an electrically insulated heating element centrally located in the channel with a terminal portion extending therefrom; and a highly conductive portion cast around the heating element in the channel to surround the heating element and form an integral unit with the body portion.

In another of its aspects, the invention further provides a method of manufacturing an integral injection molding manifold member having an elongated body with a hot runner passage extending therethrough and at least one electrical heating element extending longitudinally therein with a terminal portion projecting therefrom, comprising the steps of forming the elongated body of a suitable strong conductive metal; machining the body to provide the desired hot runner passage therethrough and at least one longitudinally extending channel in an external surface of the body; locating the electrical heating element in the channel with a terminal portion projecting therefrom, the heating element being secured in a predetermined position in the channel whereby a space is provided surrounding the heating element in the channel, and sealing around the channel to prevent substantial leakage; vacuum casting a highly conductive material into the channel to file the space surrounding the heating element with the highly conductive material, thereby forming an integral fused unit with the body.

Further objects and advantages of the invention will appear from the following description, taken together with the accompanying drawings.

BRIEF DESCRIPTION OF THE DRAWINGS

FIG. 2 is an isometric view showing a portion of a manifold member elongated body;

FIG. 3 is an isometric view showing the same manifold member body with the heating element in position for sealing;

FIG. 4 is a partially cut-away isometric view showing the sealed manifold member body with copper alloy rods in position for casting;

FIG. 5 shows a number of assembled units in position in trays for insertion into a vacuum furnace for casting;

FIG. 6 is a partially cut-away isometric view of a portion of the completed manifold member.

DESCRIPTION OF THE PREFERRED EMBODIMENTS

Figure 1:
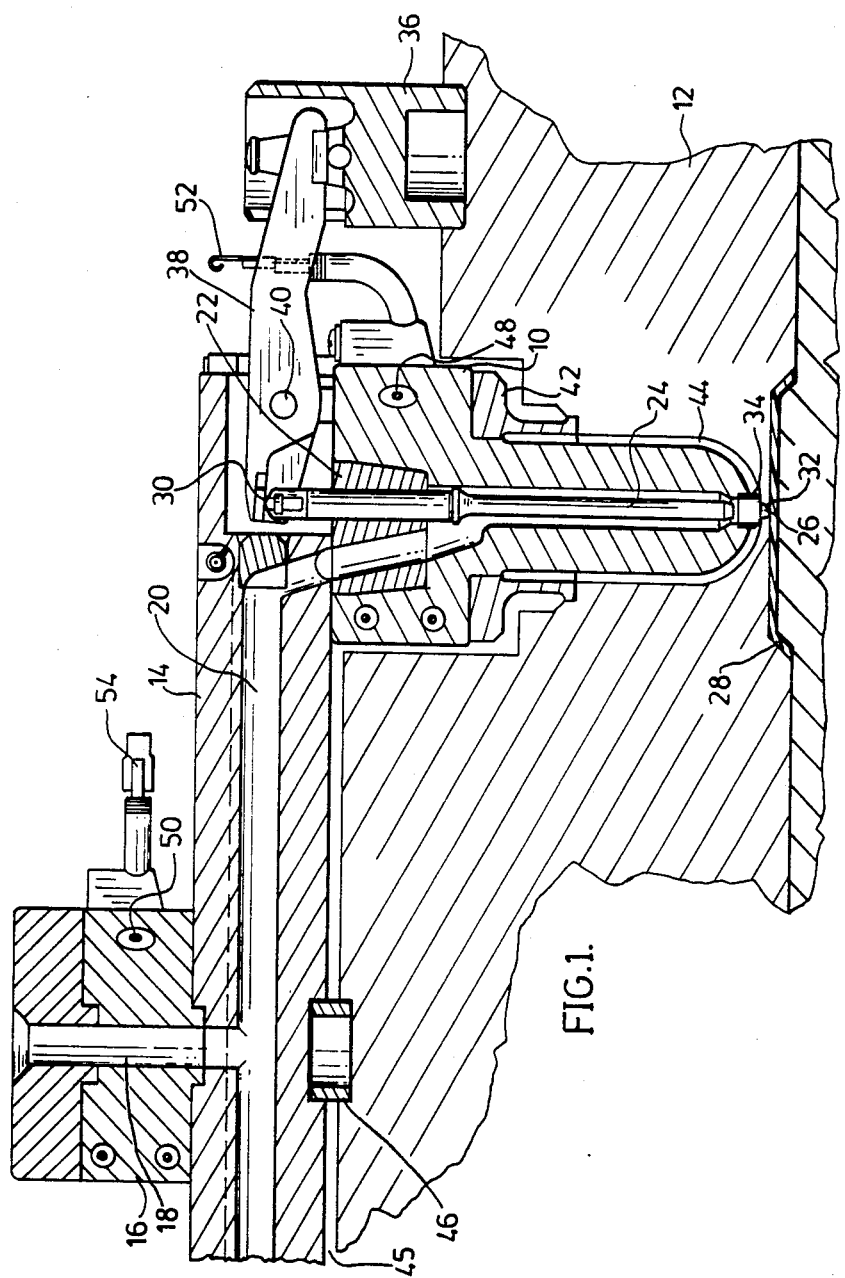
FIG. 1 is a partial sectional view of an injection molding system having a manifold member according to the invention.

Reference is first made to FIG. 1 which shows a portion of a valve gated multi-cavity injection molding system. The system has a first heater cast 10 which is seated in a cavity plate 12 and a heated manifold member 14 which extends to the first heater cast 10 from a second heater cast 16. The system has a hot runner passage 18 which extends through the second heater cast 16 to the manifold member 14 and receives pressurized melt from a molding machine (not shown). One branch 20 of the hot runner passage runs along the manifold member 14, through a bushing seal 22 seated in the first heater cast 10 and around a valve pin 24 which extends centrally through the first heater cast 10. The pressurized melt flows along the hot runner passage through a gate 26 in the cavity plate 12 into a cavity 28. The valve pin 24 has a driven end 30 and a tip end 32 which seats in the gate 26 surrounded by a nozzle seal 34. The flow of melt through the system and into the cavity 28 is controlled by the operation of the valve pin 24 as well as the melt pressure applied by the molding machine. When the cavity 28 is filled, pneumatic cylinder 36 pivots rocker arm 38 around pivot pin 40 which drives the valve pin 24 to the closed position with its tip end 32 seated in the gate 26. The melt pressure is then reduced and, after a cooling period, the mold opens to eject the part. After the mold closes again, the pneumatic pressure is released and the molding machine reapplies the high melt pressure which actuates the valve pin 24 to the open position to allow the cavity 28 to fill and the sequence is repeated. One or more other branches of the hot runner passage 18 extend through similar structure to other cavities and the whole system, of course, operates as a unit to inject the molded products simultaneously.

While, as mentioned above, it is critical that the melt temperature be maintained at a predetermined temperature as it flows through the hot runner passage 18, it is also necessary that the cavity plate 12 by cooled to a predetermined temperature so that the injected product will quickly solidify in the cavity 28. Therefore, the first heater cast 10 is seated in the cavity plate 12 on an insulation bushing 42 which maintains an insulative air space 44 between them. Similarly, the manifold member 14 and the cavity plate 12 are separated by a cylindrical spacer 46 which provides an insulative air space 45 between them. The first and second heater casts 10,16 are formed of a highly conductive material such as a beryllium copper alloy and each have a coiled electric heating element 48,50 with external terminals 52,54.

As may be seen in FIGS. 1-6, the manifold member 14 according to a preferred embodiment of the invention has an elongated body 56 with a hot runner passage 18 extending longitudinally through it. The body has two parallel channels 58,60 formed in one surface 62 in which an electric heating element 64 is centrally located. The heating element 64 has a pair of terminal portions 66,68 extending from the channels 58,60 at one end 70 of the body and the channels 58,60 are interconnected at the other end (partly shown in FIG. 1) to receive the heating element 64 which is U-shaped and has a round cross section. A highly conductive portion 72 is cast into the channels 58,60 around the heating element to form an integral unit. Bolt holes 74 are drilled through the body 56 to provide means for securing the manifold member 14 in position in the mold.

Figure 2:
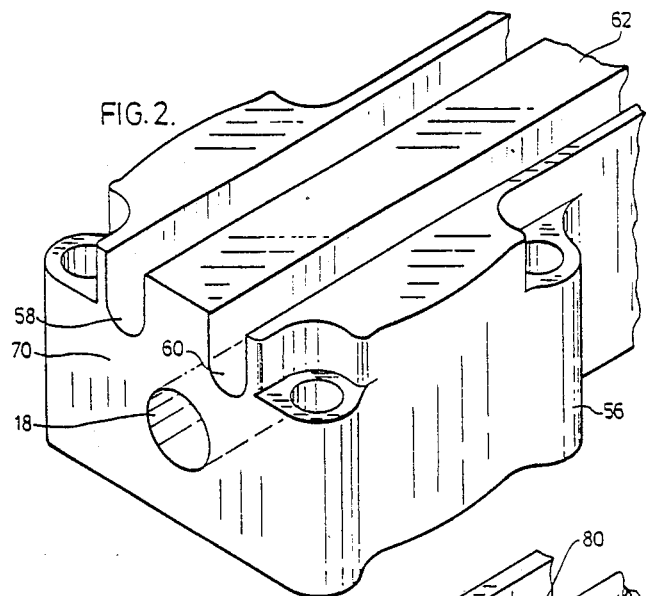
FIG. 2–6 illustrate a portion of a manifold member according to a preferred embodiment of the invention to show a sequence of steps in producing the manifold member.

Referring now to FIGS. 2-6, the sequence of steps involved in making the manifold member 14 according to a preferred embodiment of the invention may be seen. FIG. 2 shows the elongated body 56 which has been formed of a suitable material such as H13 steel. It must, of course, have sufficient strength to withstand the repeated high pressure loading during operation, and must have sufficient conductivity to transfer the heat from the heating element 64 to the melt passing through it. As may be seen, the body 56 has been drilled to form the hot runner passage 18 and to provide the bolt holes 74, as well as machined to provide the channels 58,60 which extend parallel to the hot runner passage 18 and are interconnected at the other end (not shown). The dimensions of these openings and channels may vary somewhat depending upon the application and configuration, but will be apparent to a person skilled in the art.

Figure 3:
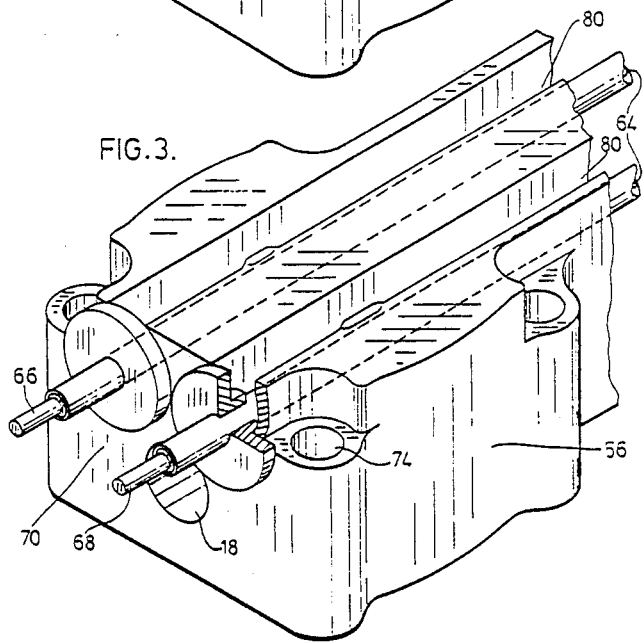
Figure 4:
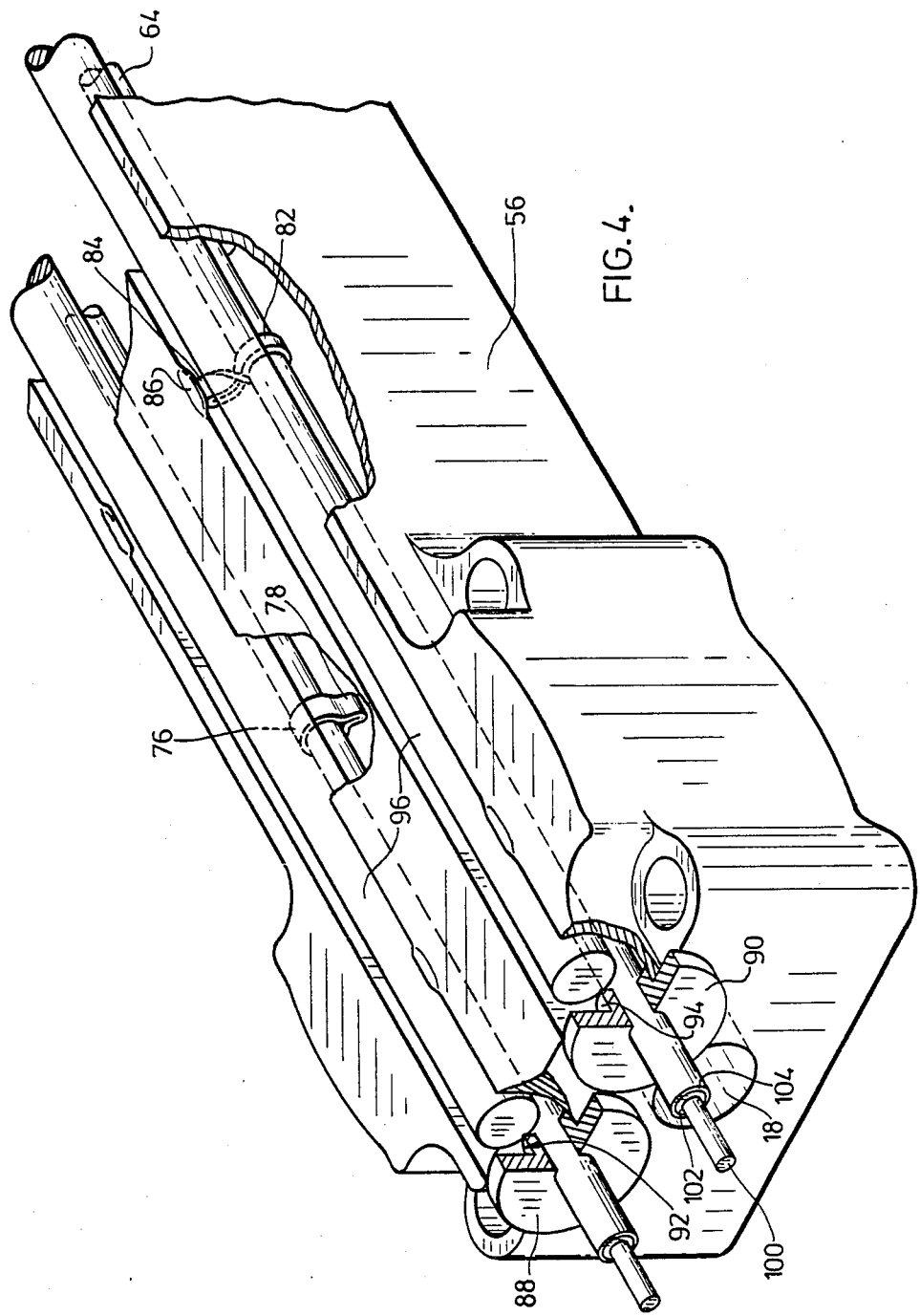

Next, a number of spacer clips 76 formed of a band of stainless steel are slipped over the terminal portions 66,68 of the heating element 64 and slid along to predetermined locations. There, they are crimped around the heating element 64 to secure them in place and provide a radially extending finger 78 of a certain length and with a predetermined orientation. As seen in FIG. 3, the heating element 64 is then inserted into the channels 58,60 where the attached spacer clips 76 keep it centrally located to provide a space 80 around the heating element 64. In order to securely retain the heating element 64 down in the channels 58,60, at certain predetermined locations, a larger spacer clip 82 is crimped onto the heating element 64 which provides a longer finger 84. As seen in FIG. 4, this longer finger 84 may be twisted to give it increased rigidity, and it extends upwardly to abut against a lip portion 86 which is formed by peening the body 56 adjacent the clip. The heating element 64 has a pair of terminal portions 66,68 extending from the channels 58,60 at one end 70 of the body 56, and a pair of sealing washers 88,90 are slipped over these. The sealing washers 88,90 have flanged portions 92,94, and they slid into abutment against the one end 70 of the body 56 with the flanged portions 92,94 received in the channels 58,60 which also helps to centrally locate the heating element in the channels 58,60. A brazing paste is then applied to the joints around the sealing washers 88,90 and the assembly is then heated in a vacuum furnace to cause the paste to melt and run all around the joints to seal them against leakage. The temperature and length of time to which the assembly is heated must be sufficient to braze the joints to seal against copper leaks with a nickel brazing paste that melts about 2180° F.

Figure 5:
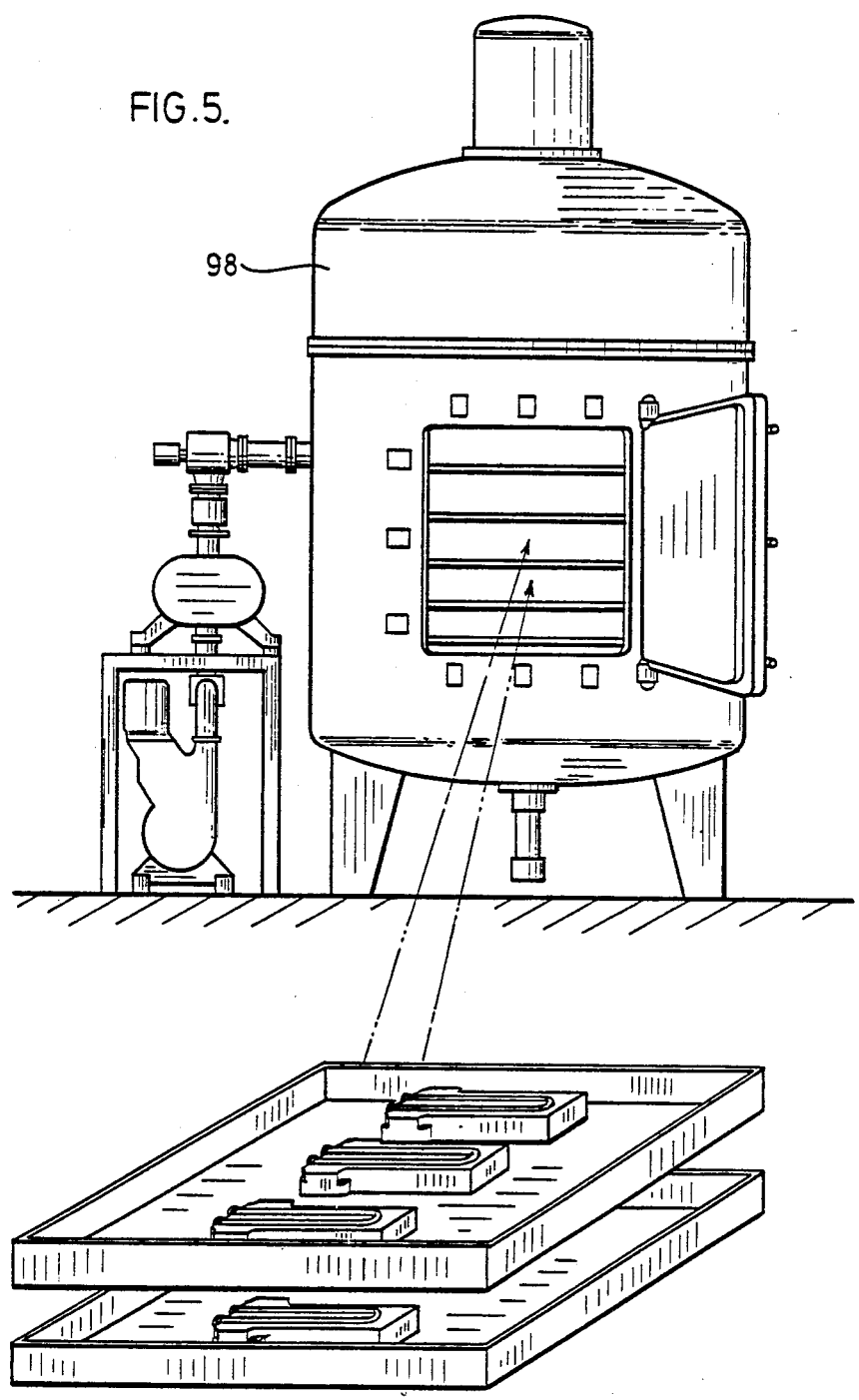
Figure 6:
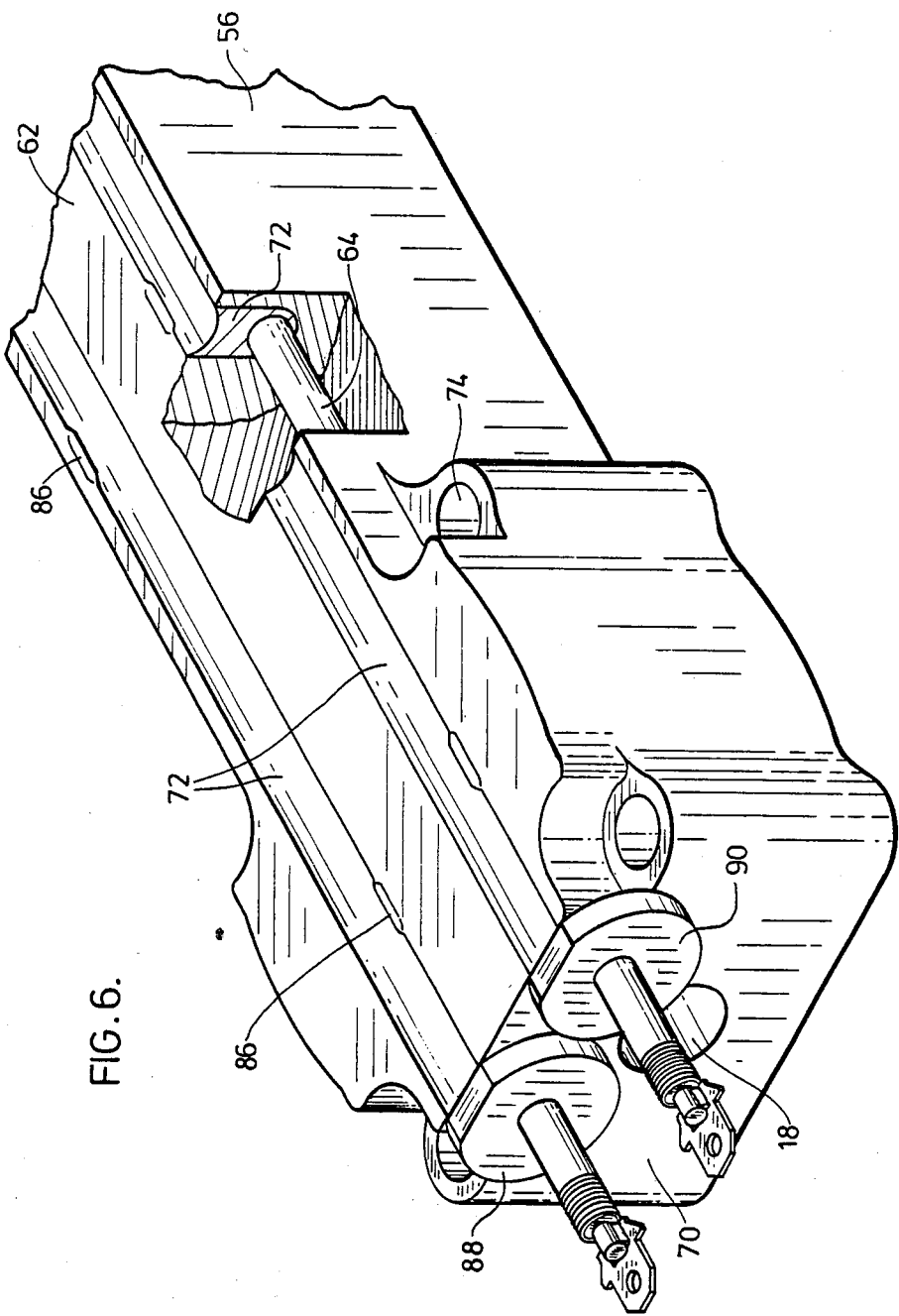

Referring to FIG. 4, after the assembly is removed from the vacuum furnace, rods 96 of a highly conductive material, such as a copper alloy, are laid on top of the heating element 64 in the channels 58,60. The highly conductive material could also be located beneath or beside the heating element, or poured in around it in powder form. A number of assemblies are then again inserted into the vacuum furance 98 in trays, as shown in FIG. 5. They are heated in the vacuum furnace for a period of time sufficient to melt the highly conductive material and cast it in the spaces 80 around the heating elements 64 to form integral units. The temperature to which the assemblies are heated must be sufficient to cast the highly conductive material, but no sufficient to melt the brazing around the sealing washers 88,90 and with a copper alloy material it could be about 1950° F. In this embodiment, the heating element 64 is formed with a central resistance wire (not shown) terminating at cold end 100 extending through a refractory powder insulating material 102 such as magnesium oxide powder inside a pliable metal sheath 104 formed of a material such as Inconel. It has been found that casting the highly conductive material in a vacuum furnace results in the copper alloy atomic bonding or fusing with the Inconel sheath 104 of the heating element as well as with the H13 steel of the body 56 which substantially improves the heat flow from the heating element 64 to the body 56. This avoids the formation of insulative air gaps which otherwise tend to create "hot spots" along the length of the heating element and lead to it eventually burning out due to excessive temperatures. It also is relatively efficient in maintaining a uniform temperature along the hot runner passage 18 which reduces deterioration of the melt due to overheating.

Figure 7:
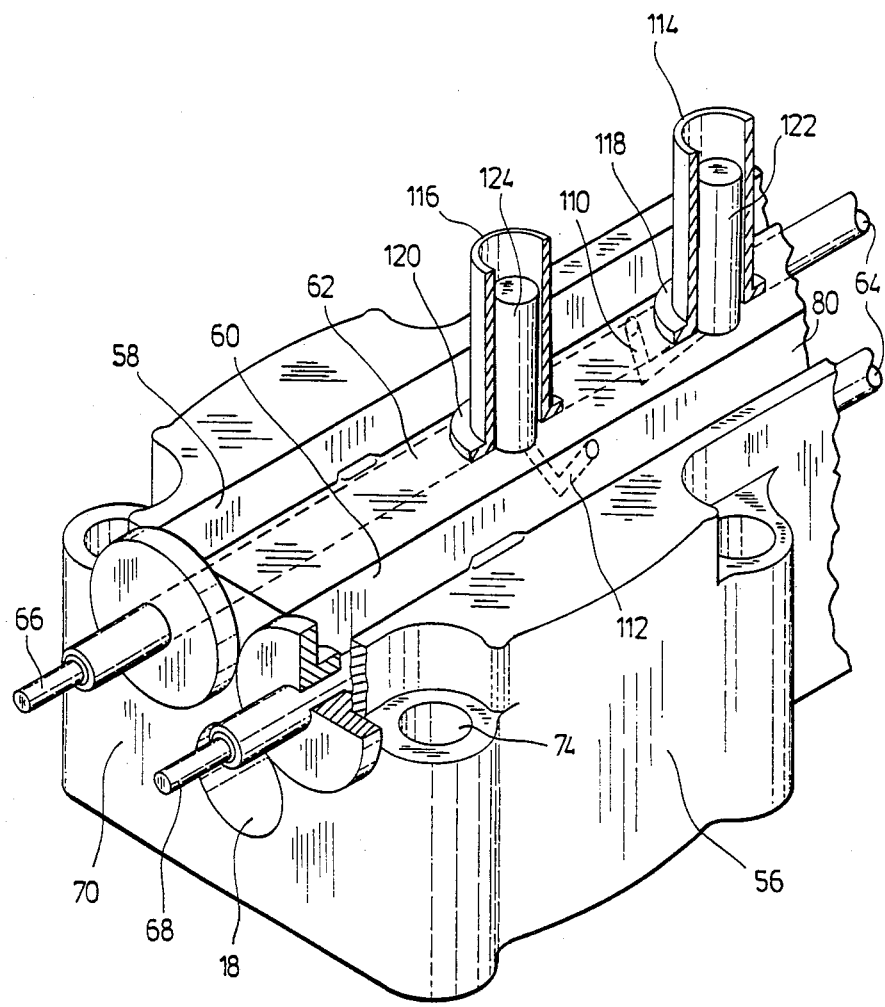
FIG. 7 is an isometric view showing filler tubes in position on the manifold member body according to an alternate embodiment of the invention.

Reference is now made to FIG. 7 which shows an alternate embodiment of adding the highly conductive material in the casting step. In this embodiment, the body 56 is drilled to provide filler ducts 110 and 112 leading from the upper surface 62 of the body 56 to the respective channels 58 and 60. Following insertion of the heating element 64, hollow cylindrical filler tubes 114 and 116, each with a base or collar 118 and 120 are then positioned on the body 56 over the respective filler ducts 110,112. A nickel brazing paste is then applied around the base 118,120 of each of the filler tubes 114,116 and when the assembly is heated on the vacuum furnace, the filler tubes 114 and 116 are brazed to the upper surface 62 of the body 56. After the assembly is removed from the vacuum furance, slugs 122 and 124 of predetermined quantities of copper alloy are inserted into the filler tubes 114,116, as seen in FIG. 7. The assemblies are then again inserted into the vacuum furnace 98 in trays as described above which causes the slugs 122,124 of copper alloy to melt and the molten copper alloy flows through the filler ducts 110,112 into the channels 58,60. The quantity of copper alloy used is calculated to fill the channels as well as the filler ducts, with a slight hump over each channel which is then machined off to provide a clean finish.

Although the description of this invention has been given with respect to particular embodiments of the manifold member 14 and methods of making it, it is not to be construed in a limiting sense. Many variations and modifications will now occur to those skilled in the art. For instance, it is apparent that the manifold member 14 and the hot runner passage 18 may be formed to a variety of different configurations. A different type of heating element requiring only a single channel could be used, or a number of heating elements could be located in channels on different surfaces of the body. Structure other than the sealing washers could be used to seal the channels. For instance, the terminal portions could extend through holes drilled in the one end of the body. A ceramic sealant may be used rather than the brazing step to seal any joints. In the embodiment shown in FIG. 7, a single filler tube could be used to fill more than one channel. For a definition of the invention, reference is made to the attached claims.

What I claim is:

1. The method of manufacturing an integral injection molding manifold member having a hot runner passage extending therethrough and at least one electrically insulated electrical heating element extending therein and generally adjacent the hot runner passage with a terminal portion projecting therefrom, comprising the steps of:
    (a) machining the manifold of steel;
    (b) machining the manifold to provide the desired hot runner passage therethrough and at least one channel in an external surface of the manifold;
    (c) locating the electrical heating element in the channel with a terminal portion projecting from one end of the channel, the heating element being secured in a predetermined position in the channel whereby a continuous space is provided surrounding the heating element in the channel;
    (d) locating a filler tube with an open upper end and a base on the said external surface with the base communicating with the said at least one channel;
    (e) sealing the channel around the said projecting terminal portion of said electric heating element so as to seal the channel against substantial leakage and fixing the filler tube to the said external surface of the body;
    (f) inserting a predetermined quantity of highly conductive material into the filler tube;
    (g) heating the assembled body and heating element in a vacuum furnace for a sufficient period of time to and at a temperature to melt the hightly conductive material which flows into the said continuous space around the heating element in the channel and along the heating element but the temperature of the highly conductive material is not sufficient to melt the said sealing around the projecting terminal portion of said electric heating element; and
    (h) machining off the filler tube.

2. A method as claimed in claim 1 wherein step (c) includes locating the heating element in the predetermined position in the channel by sliding a number of spacer clips onto the heating element and crimping them to the heating element to secure them in predetermined positions and orientation prior to location of the heating element in the channel, whereby each spacer clip provides a radially extending finger which abuts against the body to provide the space surrounding the heating element and to retain it in the predetermined position during casting.

3. A method as claimed in claim 1 wherein two channels are machined in the body to extend generally parallel to the hot runner passage, the channels being interconnected adjacent one end of the body to receive a U-shaped heating element with a pair of terminal portions extending from the channels at the other end of the body.

* * * * *